United States Patent [19]

Widdowson et al.

[11] 4,270,934

[45] Jun. 2, 1981

[54] UNIVERSAL INTERNAL TUBE ACCUMULATOR

[75] Inventors: Richard E. Widdowson, Dayton; James B. Connolly, Springfield; Earl S. Schlotterbeck, Lewisburg; J. D. Livesay, Tipp City, all of Ohio

[73] Assignee: General Motors Corporation, Detroit, Mich.

[21] Appl. No.: 101,697

[22] Filed: Dec. 10, 1979

Related U.S. Application Data

[63] Continuation of Ser. No. 912,462, Jun. 5, 1978, abandoned.

[51] Int. Cl.³ .............................................. B01D 50/00
[52] U.S. Cl. ...................................... 55/316; 55/391; 55/463; 62/503
[58] Field of Search .......... 55/391, 316, 387, 462–463, 55/320; 62/323 R, 503, 512

[56] References Cited

U.S. PATENT DOCUMENTS

| 663,099 | 12/1900 | Reynolds | 55/391 X |
|---|---|---|---|
| 2,953,906 | 9/1960 | Quick | 62/503 X |
| 3,177,680 | 4/1965 | Rasovich et al. | 62/503 X |
| 3,420,071 | 1/1969 | Bottum | 62/503 |
| 3,557,570 | 1/1971 | Brandt | 62/512 X |
| 3,651,657 | 3/1972 | Bottum | 62/503 X |
| 3,807,713 | 4/1974 | Cornett et al. | 261/DIG. 65 X |
| 3,824,802 | 7/1974 | Scherer et al. | 62/217 |
| 3,872,689 | 3/1975 | Bottum | 62/503 |
| 3,938,353 | 2/1976 | Wrenn, Jr. et al. | 62/503 |
| 3,978,685 | 9/1976 | Taylor | 62/471 |
| 4,083,705 | 4/1978 | Parise et al. | 55/467 X |
| 4,111,005 | 9/1978 | Livesay | 62/503 |
| 4,116,649 | 9/1978 | Cullen et al. | 55/387 |

Primary Examiner—Kathleen J. Prunner
Attorney, Agent, or Firm—R. L. Phillips

[57] ABSTRACT

A vehicle air conditioning system compact suction accumulator-dehydrator adaptable for multiple applications to trap liquid refrigerant flowing from the evaporator. The accumulator comprises a hollow vertically disposed tubular casing, providing top and bottom imperforate wall portions. The casing has an inlet and an outlet located in a side of the casing adjacent its top portion in substantial axial alignment. A generally U-shaped tube is located in the casing chamber with one end having a generally right-angled portion projecting into the outlet in a manner to hangingly support the tube in the chamber. An inverted cup-shaped baffle is supported in spaced relation on the tube other end for positioning in front of the casing inlet to provide a passageway from the inlet through the chamber to the inside of the tube.

3 Claims, 7 Drawing Figures

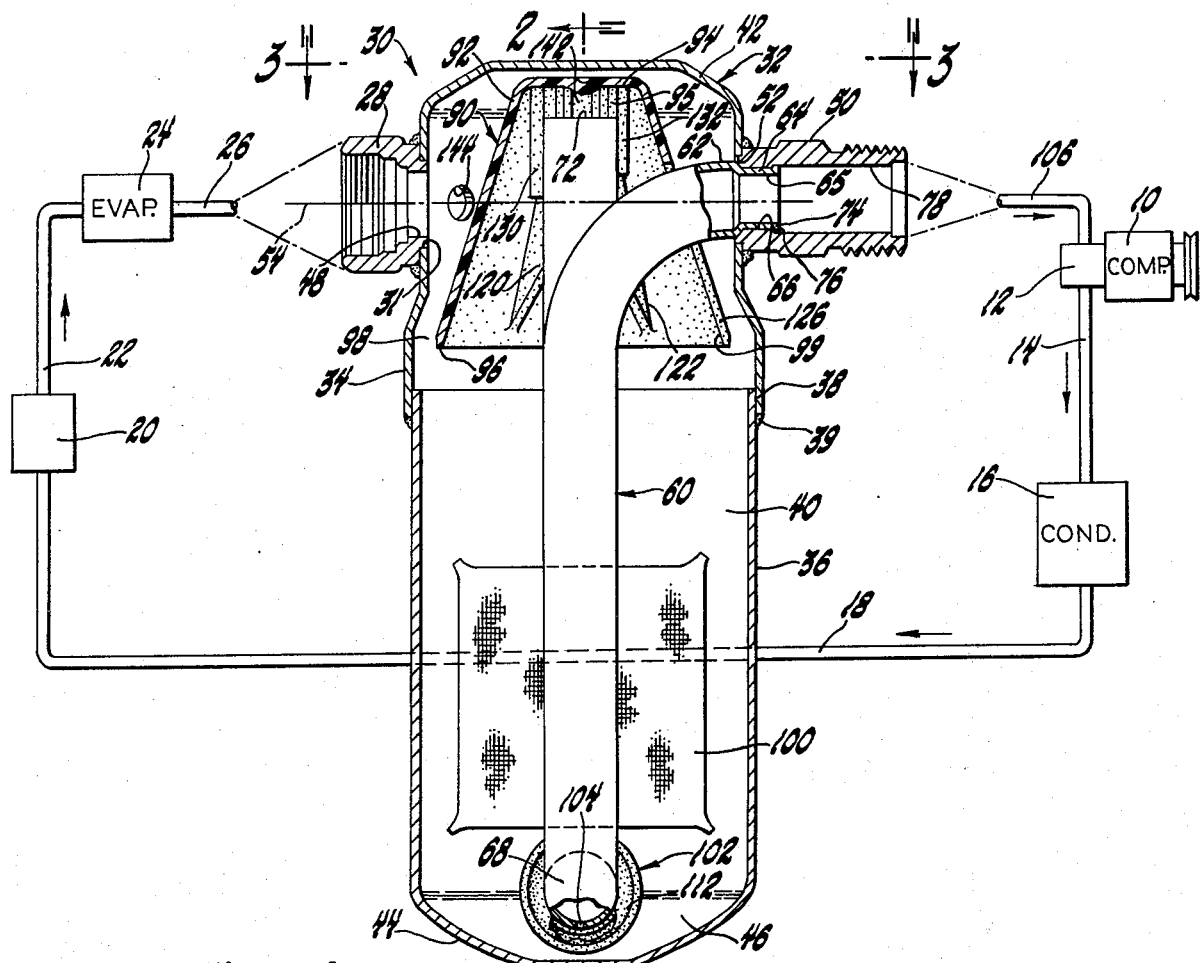
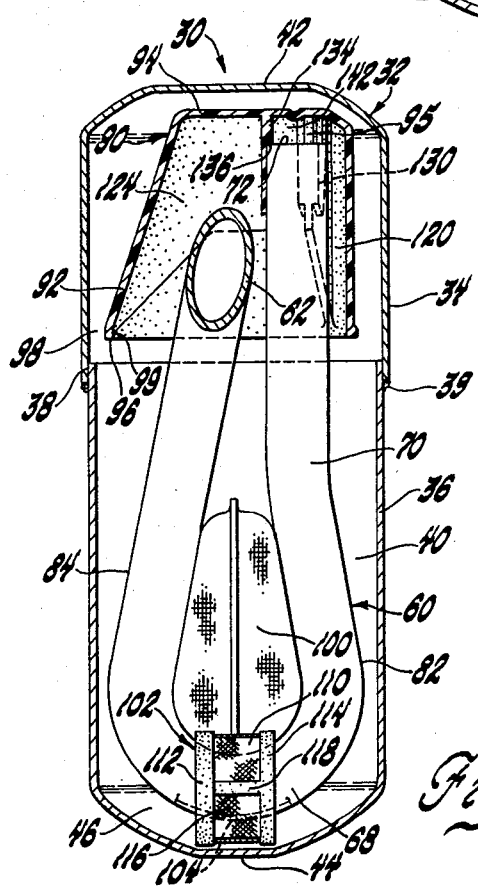
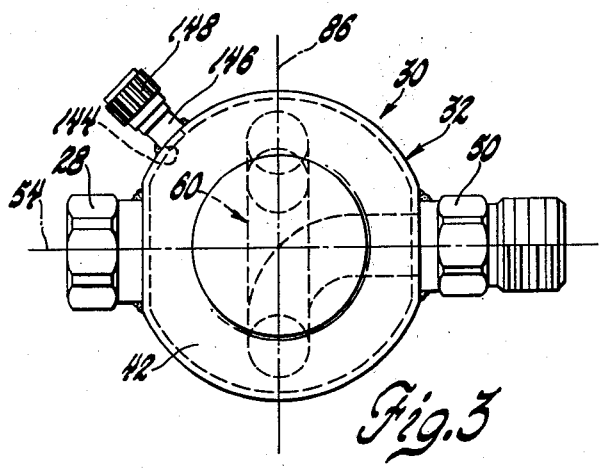

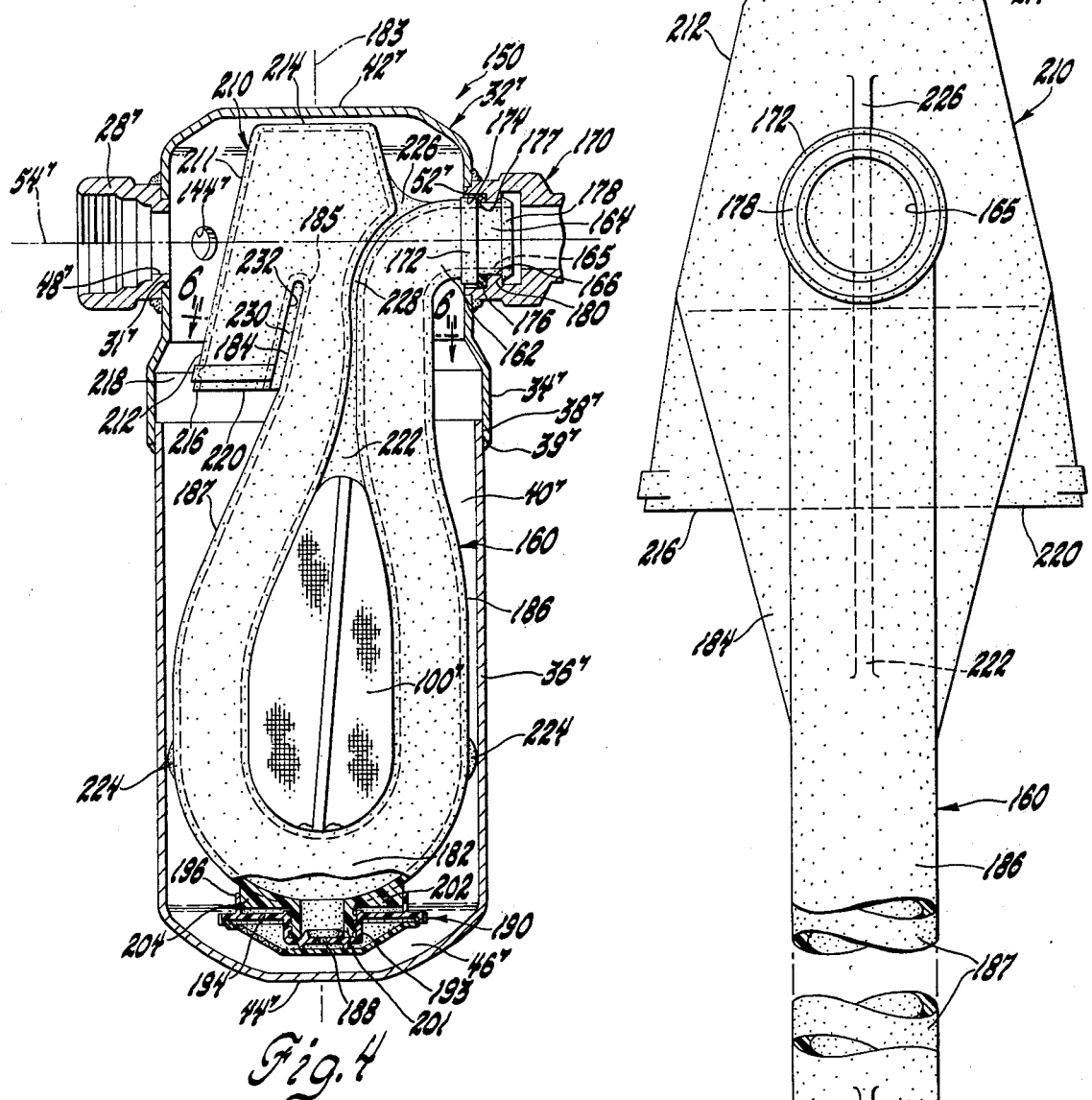

UNIVERSAL INTERNAL TUBE ACCUMULATOR

This is a continuation of application Ser. No. 912,462 filed on June 5, 1978, now abandoned.

This invention relates to suction accumulators for an automotive air conditioning system and more particularly to an improved universal internal tube suction accumulator which permits maximum installation adaptability within the engine compartment.

The U.S. Patent Application Ser. No. 785,333, now U.S. Pat. No. 4,111,005 to J. D. Livesay discloses an accumulator in an automotive air conditioning system located between the evaporator and the compressor serving as a protective device for the compressor. With the advent of downsized cars the available space in the engine compartment has been reduced such that clearance for air conditioning components and their required tubular connections has necessitated separate plumbing arrangements of each model. It is an object of the present invention to provide an improved liquid trapping suction accumulator for an automotive air conditioning system providing a compact vertically installed casing incorporating unencumbered top and bottom portions permitting maximum clearance under the hood of an automotive engine compartment and above the engine compartment components and wherein the accumulator inlet and outlet are located in the side of the casing adjacent its top portion so as to be in substantial axial alignment with each other on opposite sides of the casing for receiving the connections to the evaporator and compressor.

It is another object of the present invention to provide an improved accumulator-dehydrator for an automotive air conditioning system as set forth in the above recited object further including a U-shaped tube mounted in the chamber with one end of the tube having a generally right-angle portion projecting into the chamber outlet for hangingly supporting the tube such that its bight portion is positioned in the chamber sump and the other end of the U-tube in the top portion of the chamber above the sump, such that an inverted cup-shaped baffle is supported in spaced relation with the other end of the tube in front of the inlet with its rim in spaced relation with the side wall of the casing below the inlet and the outlet end of the tube to provide a passageway from the inlet through the chamber to the inside of the tube, together with an annular flow gap between the inlet and the sump; and wherein the bight portion includes a port adapted to be submerged in the sump in liquid flow communication with the inside of the tube, whereby the flow of liquid components into the tube are adapted to be induced by the liquid head of the liquid components in the sump and the suction of the compressor to join the gaseous components thereof inside the tube for supply of both liquid and gaseous components to the compressor through the accumulator outlet.

It is still another object of the present invention to provide an improved liquid trapping suction accumulator as set forth in the previously stated objects wherein the internal U-tube and baffle portion thereof is formed as an integral member incorporating snap-acting support coupling means projecting into the chamber outlet connection for hangingly supporting the member with its bight portion positioned in the chamber sump.

Other advantages and features of the improved accumulator will be readily apparent with reference to the following detailed description and the accompanying drawings in which preferred embodiments of the invention are illustrated.

In the drawings:

FIG. 1 is a schematic view of an automotive air conditioning system with a partial vertical sectional view of one form of the invention;

FIG. 2 is a view of the accumulator taken substantially on the line 2—2 of FIG. 1;

FIG. 3 is a top elevational view of the accumulator taken substantially on the line 3—3 of FIG. 1;

FIG. 4 is a partial vertical sectional view of a second embodiment of the invention;

FIG. 5 is a top elevational view of the internal U-tube and baffle portion of the accumulator of FIG. 4;

FIG. 6 is a vertical sectional view taken on line 6—6 of FIG. 4; and

FIG. 7 is an enlarged front elevation view of the composite internal U-tube and baffle shown in FIG. 5.

Turning now to the first embodiment of the invention shown in FIGS. 1-3, a vehicle air conditioning system is shown schematically in FIG. 1 and includes a compressor 10 for pumping and pressurizing refrigerant. The compressor 10 may be of a swash plate reciprocating axial piston compressor as shown for example in U.S. Pat. No. 3,759,058 issued Sept. 8, 1973 and assigned to the assignee of the present application. The compressor 10 includes a fitting 12 at one end which provides an outlet adapted to be connected to a conduit 14 leading to a condenser 16. The condenser 16 is normally placed immediately forward of the vehicle radiator and its purpose is to cool and liquify the hot vaporous refrigerant from the compressor 10. An outlet from the condenser is connected to a conduit 18 which in turn is connected to an inlet or vent orifice tube expander 20. The orifice tube expander is a short length, small diameter tube with associated filters about its end to reduce the pressure of liquid refrigerant from the condenser and then to pass the lower pressure liquid refrigerant through a conduit 22 to the inlet of an evaporator 24. The low pressure liquid refrigerant enters the bottom end of the evaporator 24 and passes through vertical tubes to the top end while it absorbs heat from the air passing between the tubes of the evaporator, thus cooling the air. While absorbing the heat from the air, the liquid refrigerant is vaporized and passes from the evaporator through a conduit 26 to a tubular inlet fitting 28 of an improved universal internal tube accumulator of the present invention generally indicated by the numeral 30. The inlet fitting is mounted in an opening 31 in the side wall of the accumulator casing, to be described, and the mounting may be effected as, for example, by welding. The fitting 28 is open ended and is internally threaded to receive a suitable connector, not shown.

As seen in FIG. 1, the accumulator assembly 30 includes a vertically disposed cylindrical casing, indicated generally at 32, closed by an upper shell-like imperforate wall member 34 and a lower shell-like imperforate wall member 36 to define a chamber 40. In the disclosed form the upper and lower shell-like wall members 34 and 36 are telescopically joined at a lap joint 38 and secured by suitable means such as by a weld 39. The casing upper wall member 34 includes an unencumbered top portion 42 and in a similar manner the lower wall member 36 includes an unencumbered bottom portion 44.

The chamber 40 receives refrigerant from the evaporator 24 which refrigerant may contain sufficient amounts of liquid refrigerant along with a vaporous phase, together with lubricant. As it is undesirable to pass refrigerant in the liquid phase to the compressor 10, one purpose of the suction accumulator assembly 30 is to separate liquid refrigerant from vaporous refrigerant. The chamber 40 thus defines a hollow interior having a sump 46 into which the mixture of vaporous and liquid refrigerant and entrained lubricant pass via casing chamber inlet formed by the internal bore 48 of the fitting 28.

An outlet mounting stud or fitting, generally indicated at 50, is mounted over 34 a circular opening 52 in the side of the casing upper wall member 34. The openings 31 and 52 are located in opposed relation in the side of the casing upper member 34 adjacent its top portion 42 so as to be in substantial diametrical alignment with each other on opposite sides of the casing upper member. Thus it will be seen in FIGS. 1 and 3 that the upper casing opening 52 is concentrically aligned on a first diametrical axis 54 in 180° opposed relation to the circular opening 31, also concentrically aligned on the axis 54.

A u-shaped fluid conducting internal tube, indicated generally at 60 in FIGS. 1 and 2, is positioned centrally within the chamber 40. The U-shaped tube 60 includes a generally rightangled bend portion 62, the free end of which has a reduced end portion 64, defininig casing chamber outlet 65, for telescopic reception into inner tubular passage 66 of the fitting 50. Reduced free end 64 is suitably affixed within the fitting passage 66 whereby the U-tube 60 is hangingly supported or mounted in the chamber 40 with its bight portion 68 located in the chamber sump 46. The U-shaped tube 60 has a standpipe porton 70 which extends substantially vertically such that its other free or distal end 72 is positioned in the top portion of the chamber above the sump 46.

In the embodiment of FIGS. 1-3 the reduced free end portion 64 is expanded by suitable means thereby forming a peripheral lip portion 74 which lockingly engages an internal annular shoulder 76 formed by fitting counterbore 78. In the first embodiment the lip portion 74 is suitably formed as by a "roll expand" tool wherein the end of the tube portion 64 is outwardly flared.

As seen in FIG. 2, the U-shaped tube has upwardly extending first 84 and second 82 converging leg portions. The first portion terminates in the right angled bend portion 62 and the second leg portion 82 terminates in the standpipe portion 70. It will be noted that the portion 70 is located on a vertical axis parallel to and offset from the principal vertical axis of the chamber 40. FIG. 3 shows the U-shaped tube 60, with the exception of the right angle bend portion 62, formed in a common vertical plane including a second diametrical axis 86 positioned at right angles or normal to the first axis 54.

In the FIGS. 1-3 embodiment the upper open end 72 of the standpipe 70 supports an inverted cup-shaped deflector or baffle member, generally indicated at 90, similar to an accumulator baffle disclosed in co-pending U.S. Pat. Appln. Ser. No. 785,333 to J. D. Livesay and assigned to the assignee of the present application. As disclosed in the mentioned application the baffle member 90 is molded as a one-piece or integral thin-walled member of suitable plastic material such as, for example, a 30% glass filled polyester. The modified truncated conical baffle member 90 includes an outer skirt or flared wall portin 92 and a top portion 94 having securing means 95 integrally molded on the underside thereof. The outer wall 92 has an annular open lower rim or edge 96 positioned below inlet 48 and concentric with the casing portion 34 to provide a passageway from the inlet 48 through the chamber 40 to the inside of the U-shaped tube including annular flow gap 98 between the inlet 48 and the sump 46.

In this way the refrigerant from the inlet 48 impacts against the baffle wall 92. The impact or impinging of the refrigerant mixture on the outer wall 92 causes the liquid portion thereof to separate from the vaporous portion and pass or flow along the outer surface of the wall 92 under the influence of gravity toward the sump portion 46 at the bottom of the housing chamber 40. The vaporous refrigerant also passes or flows downwardly along the baffle lower edge 96 via annular gap 98 for upward flow through the baffle open lower end 99 and thence to the open upper end 72 of the vertical tube portion or standpipe via a plurality of baffle openings to be described. It will be noted that accumulated liquid refrigerant in the housing sump portion 46 will eventually vaporize due to low pressure conditions which normally exist within the accumulator as a result of the continual evacuation thereof by the compressor 10.

It will be appreciated that the accumulator performs an additional function of removing moisture which may be mixed with refrigerant in the same manner as the above-mentioned Pat. Application Ser. No. 785,333. For this purpose a desiccant assembly 100 is supported within the U-shaped tube bend. The desiccant assembly includes an envelope or bag containing a quantity of moistureabsorbing or desiccant material which in the present embodiment is silicate jel or molecular sieve particles. The envelope is conveniently made of clothlike polypropylene felt material, the edges of which are heat sealed together to form the bag structure. The bag structure is captured in the U-bend of tube portion 60 and supported on tube bight portion 68 above filter assembly 102 to be described.

As explained in the aforementioned Livesay patent application, in addition to liquid refrigerant collecting in the sump portion 46, a quantity of oil will also collect in the sump. The oil is mixed with the refrigerant in the air conditioning system to circulate therewith for lubrication of the compressor 10. To return the collected oil to the air conditioning system for delivery to the compressor a small oil port or inlet bleed hole 104 is provided on the underside of the U-shaped tube 60 at the lowest point of the bight portion 68 in communication with the chamber sump 46. It will be understood that the port 104 is adapted to be in the submerged portion of the sump 46 placing the sump in liquid flow communication with the inside of the U-shaped tube 60. The flow of liquid components such as the oil into the U-shaped tube 60 is adapted to be induced by the combined refrigerant and lubricant head in the sump together with the suction created in the U-shaped tube by the compressor. In this manner the oil joins the gaseous components inside the U-shaped tube 60 for supply of both oil and gaseous refrigerant to the compressor through the chamber outlet 65.

Oil and a small quantity of liquid refrigerant are thus continually drawn into the U-shaped tube 60 and suction line 106 for return to the compressor 10 to supply lubrication to the compressor while preventing substantial quantities of oil being accumulated in the sump. A cylindrical screen assembly, generally indicated at 110, is telescopically supported about the bight portion 68 of the U-shaped tube to intercept particles in the oil and refrigerant and to prevent clogging the port 104. In the preferred form the screen assembly includes molded plastic ring support end members 112 and 114 respectively, which are heat sealed to screen-like material 116 forming a part of the cylindrical screen assembly. As seen in FIG. 2, a number of frame members 118 are integrally molded between the ring end members to strengthen the screen assembly.

With reference to FIGS. 1 and 2, it will be seen that the baffle securing means is in the form of three vertically extending radial webs including a pair of smaller webs 120, 122 and a large web 124. The webs 120 and 122 are symmetrically spaced at about 60° arcuate intervals on either side of a vertical plane defined by axis 86, while the web 124 is arcuately spaced at 120° intervals from each web 120 and 122 so as to be substantially aligned on the vertical plane of axis 86. Each of the webs 120, 122 and 124 include integral arcuate-sectioned ribs 130, 132 and 134 oriented with their centers on the principal axis of the vertical standpipe 70 to provide a telescopic slidable press-fit with the upper end of the standpipe. It will be noted that each rib 130, 132 and 134 has a stop shoulder 136 adjacent its upper end operative to engage the standpipe free upper open end 72. By virtue of this structure the baffle closed top or upper end wall 94 is spaced a predetermined distance above the standpipe open end 72 to define with the arcuate ribs 130, 132 and 134 vapor passage means in the form of three equally spaced vapor passages 142. The passages 142 allow vaporous refrigerant which flows upwardly both from the casing sump 46 and around the baffle open lower edge 96 along the baffle inner wall for entrance into the U-shaped tube standpipe upper open end 72 via the vapor passages 142.

It will be noted in FIG. 1 that the baffle outer wall 92 has therein an elongated upwardly extending slotted portion 126 substantially aligned on the vertical plane of the first diametrical axis 54. The slotted portion 126 is of a size whereby the U-shaped tube right-angle bend portion 62 being initially received in the slotted portion 126 the standpipe upper end 72 may be press-fitted into arcuate-sectioned ribs 130, 132 and 134. Thus, upon the U-shaped tube reduced portion 64 being telescopically secured in the inner tubular passage 66 the baffle member 90 is positioned in operative concentric fashion within the housing chamber to define the annular flow gap 98. FIGS. 1 and 3 show the upper wall member 34 provided with an aperture 144 in its side wall sized to receive the tube smaller diameter terminal portion of a refrigerant charge fitting 146 having a valve core and external threads protected by a cap 148.

Turning now to FIGS. 4–7, a modified embodiment of the subject invention is disclosed wherein like components have been assigned corresponding primed reference numerals. The accumulator assembly 150 includes a vertically disposed cylindrical casing, generally indicated at 32', composed of upper 34' and lower 36' shell-like imperforate wall members defining a chamber 40' in a suitable manner such as described for casing 32 in FIGS. 1–3. The inlet fitting 28' of the accumulator assembly has a cylindrical reduced diameter portion mounted in opening 31' in the side wall of upper wall member 34' such that when the fitting 28' is suitably connected to the system evaporator, as indicated in FIG. 1, it allows vaporized refrigerant to pass from the evaporator into the interior of the housing chamber 40'.

In the second form of the invention of FIGS. 4–7 the U-shaped tube 60 and baffle 90 of the first embodiment are combined into an integral network or unipartite plastic member of homogeneous construction preferably blow molded of polypropylene plastic, comprising U-shaped tube 160 and baffle 210 for location within the chamber 40'. The U-shaped tube portion 160 of the network includes a generally right-angled portion 162 the free end of which has a reduced end portion 164, defining chamber outlet 165, designed for telescopic reception into inner tubular passage 166 of the fitting 170. The reduced end portion 164 is separated from the right-angled portion 162 by an annular collar 172 having a reduced end shoulder 173 molded as part of the U-shaped tube 160.

As seen in FIG. 4, the entrance end of fitting 170 has a counterbore 174 defining an internal shoulder 177 sized to seat an O-ring seal 176. The reduced end 164 is formed with an enlarged frustoconical shaped lip 178 on its end to provide snap-action reception over internal rib 180 of fitting 170 whereby the O-ring 176 is compressed into locking and sealing engagement between the seating internal shoulder 177 and the reduced end shoulder 173. Sealing engagement of the O-ring is accomplished by effecting a diametrical squeeze between counterbore 174 I.D. and tube reduced end 164 O.D. In this manner the free end 164 is suitably affixed within the fitting 170 whereby the U-shaped tubular network 160 is hangingly supported in the chamber 40' with its bight portion 182 located in the chamber sump 46'. The U-shaped tube includes a standpipe portion 184 which extends substantially vertically such that its upper or other free end 185 is positioned in the top portion of the chamber 40' above the sump 46'.

In the manner of the embodiment of FIGS. 1–3, the U-shaped tube 160 has upwardly extending first 186 and second 187 converging leg portions with the leg portion 187 terminating in the standpipe tube portion 184. It will be noted that in the form of the invention disclosed in FIGS. 4–7 the standpipe tube portion 184 is located substantially on the principal vertical axis 183 of the chamber 40'. Also, as seen in FIG. 4, the U-shaped tube 160 is symmetrically positioned relative to a vertical plane common to first diametrical axis 54' such that the casing 32', inlet 48' and outlet 165 are located in substantial axial alignment with each other on opposite sides of the casing 32' for receiving the connection to the evaporator 24 and compressor 10, respectively. It will be noted in FIG. 6 that the standpipe 184 has a substantially elongated rectangular section to provide an inlet 185 of sufficient extent to insure free flow of the refrigerant gas therethrough.

In accordance with the invention the bight portion 182 of the U-tube 160 includes a port 188 adapted to be in the submerged portion of the sump 46' in liquid flow communication with the inside of the U-shaped tube. In the embodiment of FIGS. 4–7 the port 188 is provided in a filter assembly 190 including an annular shaped downwardly depending ring member 193 integrally molded with an annular washer 194. The washer 194 has an upstanding circular flange 196. As best seen in FIG. 7 the ring member 193 is internally threaded at 198 for engagement with external threads 200 formed on a hollow hub 201 shown integrally molded on the underside of the bight portion 182. It will be noted in FIG. 4 that the bight portion 182 includes a pair of fin members 202, 204 aligned on the medial plane of the U-tube 160 on either side of the hub 201. With reference to FIG. 7, the circular flange 196 has formed around its inner periphery a plurality of sawtooth shaped ratchet teeth 206 operative for engaging the distal ends of the fins 202, 204. Thus, as the ring member 193 is threaded on the hub 201 the ratchet teeth 206 serially engage the fins 202, 204. Upon completion of its clockwise rotation the filter assembly 190 is in locking engagement with the hub 201, preventing its being rotated in a counterclockwise direction. In this manner the filter assembly is prevented from inadvertent removal after the U-tube 160 is assembled in its chamber 40'. The filter assembly 190 includes radial supports 207 which are heat sealed to screen-like material 208. The screen 208 intercepts particles in the oil and refrigerant to prevent their clogging the port 188.

As seen in FIGS. 4–7, the U-shaped tube 160 has a cup-shaped deflector or baffle portion, indicated generally at 210, molded integral with the U-shaped tube with its upper wall portion 211 having a modified truncated conical shape terminating in a lower semi-circular skirt or flared wall portion 212. The baffle upper end is closed by a top wall portion 214. The lower flared wall portion 212 is in radial spaced relation with the internal open end 185 of the standpipe tube, and terminates at an annular open lower rim or edge 216 positioned below chamber inlet 48' and concentric with the adjacent portion of the cylindrical casing 32' to provide a passageway from the inlet through the chamber 40' to the inside of the U-shaped tube 160 via its upper open end 185. The passageway includes an annular flow gap 218 between the inlet 48' and the sump 46'.

Thus, in a like manner with the embodiment of FIGS. 1-3, refrigerant from the evaporator 24 enters the chamber 40' via its inlet 48' and impacts against the baffle wall 212. The impact or impinging of the refrigerant-oil mixture on the outer wall 212 causes the liquid portion thereof to separate from the vaporous portion and pass or flow along the outer surface of the wall 212 under the influence of gravity toward the sump portion 46' at the bottom of the housing chamber 40'. The vaporous refrigerant also passes or flows downwardly through the gap 218 along the baffle lower rim 216 for upward flow through the baffle open lower end 220 and thence to the open upper end 185 of the vertical tube portion or standpipe 184. As in the first embodiment the accumulated liquid refrigerant in the housing sump portion 46' will eventually vaporize resulting from low pressure conditions which normally exist within the accumulator chamber as a result of the continual evacuation thereof by the compressor. A desiccant bag 100' is supported within the U-shaped tube bend in a manner similar to the embodiment of FIGS. 1-3. The bag 100' upper portion engages the lower edge of web portion 222 integrally formed between the right-angled bend portion 162 and the standpipe portion 184. It will be noted that guide tabs 224 are molded on the outer surface of the U-shaped tube legs to stabilize the network within the chamber 40'.

As seen in FIGS. 4 and 6, an upper web portion 226 is joined to the lower web portions 222 by the integral "pinch line" 228 formed during the preferred blow molding process. A similar integral web or pinch line 230 is provided between the standpipe 184 and inner substantially planar wall portion 232 of the baffle 210.

While the embodiment of the present invention as herein disclosed constitutes a preferred form, it is to be understood that other forms might be adopted.

The embodiments of the invention in which an exclusive property or privilege is claimed are defined as follows:

1. In an accumulator-dehydrator assembly for an air conditioning system and of the type having a casing comprised of upper and lower portions which are each closed at one end and open at the other end and are adapted to be sealingly joined together at their open ends and wherein the upper casing portion has both an inlet fitting and an outlet fitting for connection respectively to an evaporator and a compressor in the system, the improvement comprising a subassembly having a U-shaped tube and a baffle and a desiccant element which are securable as a unit in said casing and at a single point to said upper casing portion prior to joining of said lower casing portion therewith, said tube having a pair of leg portions adapted to extend substantially the length of said casing and a bight portion with a port therethrough adapted to be located adjacent the closed end of said lower casing portion, said desiccant element being formed so as to be wholly retained by said tube by said bight portion, one of said leg portions having an open end located adjacent said closed end of said upper casing portion, said baffle being wholly supported by said tube and adapted to be interposed between said open end of said one leg portion and said inlet fitting on said upper casing portion, and an open end of said other leg portion and said outlet fitting on said upper casing portion having cooperating connector means for permitting said open end of said other leg portion to be inserted in said outlet fitting from the interior of said upper casing portion and then providing for permanent attachment therebetween whereby said subassembly is fixed in said outlet fitting from the interior of said upper casing portion prior to joining of said lower casing portion thereto and whereafter said subassembly remains secured in place in said casing independent of any attachment to said casing except for the attachment thereto at said outlet fitting.

2. In an accumulator-dehydrator assembly for an air conditioning system and of the type having a casing comprised of upper and lower portions which are each closed at one end and open at the other end and are adapted to be sealingly joined together at their open ends and wherein the upper casing portion has both an inlet fitting and an outlet fitting for connection respectively to an evaporator and a compressor in the system, the improvement comprising a subassembly having a U-shaped tube and a baffle and a desiccant element which are securable as a unit in said casing and at a single point to said upper casing portion prior to joining of said lower casing portion therewith, said tube having a pair of leg portions adapted to extend substantially the length of said casing and a bight portion with a port therethrough adapted to be located adjacent the closed end of said lower casing portion, said desiccant element being formed so as to be wholly retained by said tube at said bight portion, one of said leg portions having an open end located adjacent said closed end of said upper casing portion, said baffle being separately formed and then fixed to said tube and adapted to be interposed between said open end of said one leg portion and said inlet fitting on said upper casing portion, and an open end of said other leg portion and said outlet fitting on said upper casing portion having cooperating connector means for permitting said open end of said other leg portion to be inserted in said outlet fitting from the interior of said upper casing portion and then providing for permanent attachment therebetween whereby said subassembly is fixed in said outlet fitting from the interior of said upper casing portion prior to joining of said lower casing portion thereto and whereafter said subassembly remains secured in place in said casing independent of any attachment to said casing except for the attachment thereto at said outlet fitting.

3. In an accumulator-dehydrator assembly for an air conditioning system and of the type having a casing comprised of upper and lower portions which are each closed at one end and open at the other end and are adapted to be sealingly joined together at their open ends and wherein the upper casing portion has both an inlet fitting and an outlet fitting for connection respectively to an evaporator and a compressor in the system, the improvement comprising a subassembly having a U-shaped tube and a baffle and a desiccant element which are securable as a unit in said casing and at a single point to the interior of said upper casing portion prior to joining of said lower casing portion therewith, said tube having a pair of leg portions adapted to extend substantially the length of said casing and a bight portion with a port therethrough adapted to be located adjacent the closed end of said lower casing portion, said desiccant element being formed so as to be wholly retained by said tube at said bight portion, one of said leg portions having an open end located adjacent said closed end of said upper casing portion, said baffle being integrally formed with said tube and adapted to be interposed between said open end of said one leg portion and said inlet fitting on said upper casing portion, and an open end of said other leg portion and said outlet fitting on said upper casing portion having cooperating connector means for permitting said open end of said other leg portion to be inserted in said outlet from the interior of said upper casing portion and then providing for permanent attachment therebetween whereby said subassembly is fixed in said outlet fitting from the interior of said upper casing portion prior to joining of said lower casing portion thereto and whereafter said subassembly remains secured in place in said casing independent of any attachment to said casing except for the attachment thereto at said outlet fitting.

* * * * *

UNITED STATES PATENT AND TRADEMARK OFFICE
CERTIFICATE OF CORRECTION

PATENT NO. : 4,270,934
DATED : June 2, 1981
INVENTOR(S) : Richard E. Widdowson et al It is certified that error appears in the above—identified patent and that said Letters Patent is hereby corrected as shown below:

Title page, in the references, "Cornett et al" should read -- Cornett, III et al --.

Column 3, line 25, "u" should read -- U --.

Column 3, line 29, "defininig" should read -- defining --.

Column 3, line 68, "portin" should read -- portion --.

Column 5, line 41, after "whereby" insert -- upon --.

Signed and Sealed this

Seventeenth Day of November 1981

[SEAL]

Attest:

GERALD J. MOSSINGHOFF

Attesting Officer                Commissioner of Patents and Trademarks